Patented June 6, 1933

1,912,608

UNITED STATES PATENT OFFICE

WALTER WEIBEZAHN, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY

PROCESS OF PREPARING VINYL ESTERS

No Drawing. Application filed February 20, 1932, Serial No. 594,378, and in Germany November 13, 1930.

The present invention relates to an improved process of preparing vinyl esters.

A process is already known for preparing ester of vinyl alcohol by causing acetylene to act upon carboxylic acid in the presence of a mercury compound having a catalytic action. In this process the reaction takes place slowly and the catalytic efficacy of the mercury compound soon slackens. Numerous attempts have already been made to improve this method of working by adding to the reaction mixture another substance capable of promoting the reaction and of increasing the lifetime of the catalyst, for instance a mineral acid, particularly sulfuric acid. However, the use of these acids involves the disadvantage that the vinyl ester which has been formed is more liable to polymerize or to form the corresponding ethylidene compound with carboxylic acid; by only a slight raise of temperature these two secondary reactions are considerably promoted, thus diminishing the yield of vinyl ester.

I have now found that the action of acetylene upon carboxylic acid in the presence of a mercury compound having a catalytic action can be considerably promoted by the addition of boron trifluoride to the reaction mixture. This involves the advantage that the reaction takes place sufficiently quickly at 20° C. to 35° C., without the formation of a considerable quantity of ethylidene compound or polyvinyl compound or resin; hence the yield of vinyl ester is hardly impaired when using this new process. A further advantage of the new process is that, due to the low temperature, the mercury compound has a considerably longer lifetime and is capable of producing 5 to 7 times the quantity of vinyl ester than it was the case when working, for instance, in the presence of sulfuric acid. It is evident therefrom that as to the yield obtained the new process is far superior to all the known processes carried out with the use of mercury compounds alone.

Obviously boron trifluoride can be used in all hitherto known processes of preparing vinyl esters from carboxylic acid and acetylene wherein mercury compounds are used as catalysts. It is evident therefrom that boron trifluoride is operative in combination with all mercury compounds known to promote the said reaction.

The vinyl ester may be isolated from the reaction mixture, for instance, by first adding a small quantity of sodium salt of the acid used, for instance, sodium acetate or sodium butyrate, and then distilling the vinyl ester, or by extracting the mixture or subjecting it to a distillation under reduced pressure.

The reaction may be performed in a continuous manner by introducing acetylene in a compressed state into a reaction tower filled with acid and a catalyst. Care must be taken that in the top part of the tower a certain amount of the reaction liquid is derived for the purpose of isolating the vinyl ester, the corresponding amount of new contact liquid being introduced at the same time into the bottom part of the tower. The excess of acetylene gas is reconducted into the apparatus, if desired after the vinyl ester contained in the acetylene gas has been removed. Working under a raised pressure involves the advantage that, owing to the improved solubility of the acetylene, the reaction is promoted. Furthermore, the use of boron trifluoride at the said low temperatures brings about that the vinyl ester formed can remain in contact with the reaction liquid for a prolonged time without being polymerized.

I have found that the new process is particularly suitable for the preparation of vinyl esters of aliphatic saturated acids containing two to six carbon atoms, such as of acetic acid, propionic acid, butyric acid, caproic acid or valeric acid.

The following examples serve to illustrate my invention, but they are not intended to limit it thereto, the parts being by weight:

1. To 100 parts of absolutely anhydrous acetic acid there are added 0.5–1 part of mercuric oxide and 1.5 parts of a solution containing 12 parts of boron trifluoride and 88 parts of absolutely anhydrous acetic acid; acetylene is introduced into this mixture at a temperature between 30° C. and 35° C., while thoroughly stirring. After 3-4 hours the absorption of acetylene is nearly complete. 4 parts of anhydrous sodium acetate are added to the solution and the whole is well stirred. After half an hour the solution is filtered and distilled. The yield of vinyl acetate, calculated upon the quantity of acetylene used, amounts to 80 per cent. and more. Only a very small quantity of ethylidene diacetate and polyvinyl acetate is formed.

2. 100 parts of anhydrous butyric acid are mixed with 0.8 part of mercuric oxide and 2 parts of a solution containing 10 parts of boron trifluoride and 90 parts of butyric acid; acetylene is introduced into the mixture at a temperature between 25° C. and 30° C., while well stirring. After 7 hours the whole is stirred for half an hour with 5 parts of sodium butyrate and after the filtration the solution is subjected to distillation under reduced pressure. The yield of vinyl butyrate, calculated upon the acetylene used, amounts to 70-80 per cent. of the theory.

3. 100 parts of anhydrous propionic acid are mixed with 1.1 parts of mercuric propionate and 2 parts of a solution containing 11 parts of boron trifluoride and 89 parts of propionic acid. Acetylene is introduced into the mixture at 25° C. to 30° C., while well stirring. After 6-8 hours the mixture is stirred for half an hour together with 5 parts of sodium propionate, filtered and subjected to the distillation. The yield of vinyl propionate amounts to 70-80 per cent. of the theory.

I claim:

1. The process which comprises acting with acetylene upon aliphatic saturated monocarboxylic acids in the presence of a mercury compound known to promote the reaction, with the addition of boron trifluoride.

2. The process which comprises acting with acetylene upon aliphatic saturated monocarboxylic acids containing two to six carbon atoms in the presence of a mercury compound known to promote the reaction, with the addition of boron trifluoride.

3. The process which comprises acting with acetylene upon aliphatic saturated monocarboxylic acids in the presence of mercuric oxide, with the addition of boron trifluoride.

4. The process which comprises acting with acetylene upon aliphatic saturated monocarboxylic acids containing two to six carbon atoms in the presence of mercuric oxide, with the addition of boron trifluoride.

5. The process which comprises acting with acetylene upon acetic acid in the presence of mercuric oxide and boron trifluoride.

6. The process which comprises acting with acetylene upon butyric acid in the presence of mercuric oxide and boron trifluoride.

7. The process which comprises acting with acetylene upon propionic acid in the presence of mercuric propionate and boron trifluoride.

In testimony whereof, I affix my signature.

WALTER WEIBEZAHN.